Jan. 29, 1974  A. P. COPPA  3,788,934
THREE-DIMENSIONAL FOLDED STRUCTURE WITH CURVED SURFACES
Filed Oct 1 1971  5 Sheets-Sheet 1

INVENTOR.
ANTHONY P. COPPA
BY
Morton C. Jacobs

Jan. 29, 1974 A. P. COPPA 3,788,934
THREE-DIMENSIONAL FOLDED STRUCTURE WITH CURVED SURFACES
Filed Oct. 1 1971 5 Sheets-Sheet 4

INVENTOR.
ANTHONY P. COPPA
BY
Morton C. Jacobs

United States Patent Office 3,788,934
Patented Jan. 29, 1974

3,788,934
THREE-DIMENSIONAL FOLDED STRUCTURE WITH CURVED SURFACES
Anthony P. Coppa, 748 S. Highland Ave.,
Merion, Pa. 19066
Filed Oct. 1, 1971, Ser. No. 185,640
Int. Cl. A63g *31/00;* A63h *33/16;* B32b *3/30*
U.S. Cl. 161—17
11 Claims

ABSTRACT OF THE DISCLOSURE

A three-dimensional fold structure is formable in a polygonal cross-section from a sheet having a plurality of curved hinge lines which are undulating and non-crossing. The axes of the undulating hinge lines have a substantial component along the axis of the structure, and adjacent hinge lines undulate in opposite directions.

BACKGROUND OF THE INVENTION

This invention relates to structures of various types that can be derived from a foldable sheet. Known forms of foldable structures consist of arrays of planar elements, formed from solid or partially solid panels, so configured that when completely unfolded the entire structure will lie in a single uninterrupted plane or sheet. In the folded configuration, these elements comprise a structure having outstanding qualities of rigidity, variety of shape, as well as unique and novel features of flexibility and transformability from one shape into another. The structures comprise a general system of folded shells, any particular form of which may be designed in an exact manner by utilizing geometrical forms. Descriptions of these structures are presented in the publication, "A Family of Rigid Shell Structures, Self-Deployable From Folded Configurations of Small Initial Volume" of applicant, Paper No. 68–359 of the American Institute of Aeronautics and Astronautics, 1968.

It has been found by applicant that structures can be composed of curved surfaces throughout, and without any plane surfaces. The fold lines between such curved surfaces are also curved. This feature gives rise to advantages in that it results in only two surfaces in mutual contact, rather than as many as six in the case of folded structures using planar surfaces. Also, there are no points of intersection of the curved fold lines, whereas in the planar case as many as six straight fold lines can have a common contact. This advantage results in simpler fold or hinge line geometry which facilitates fabrication, lessens the severity of mechanical strain, and the possibility of breaks or ruptures in these regions. Such ruptures could for example result in loss of weather tightness, gas tightness, or structural integrity, which might be quite serious depending on the application.

Another feature of the curved-surface system is the greater rigidity which the curvature imparts to the surface of the structure. Hence, under wind or other distributed loading, panel defections will be less than in the planar-surface system, the degree of superiority being directly dependent on the amount of curvature present. Furthermore, the curved-surface foldable structure offers special opportunities for ornamental design.

SUMMARY OF THE INVENTION

It is among the objects of this invention to provide a new and improved foldable structure.

Another object is to provide a new and improved foldable structure having curved surfaces and curved fold lines.

Another object is to provide a foldable structure having curved surfaces that may be used to fabricate ordinary objects of a utilitarian nature which are characterized by special ornamental features.

Another object is to provide a new and improved fold structure that can be erected to form various conical, cylindrical and other shaped objects.

In accordance with different forms of this invention, a fold structure is formed from a sheet having a plurality of undulating, non-crossing curvilinear lines. Each of these lines forms a hinge and the adjacent portions of the sheet are curved when the sheet has been formed into a three-dimensional shape. This basic structure may be formed in various ways from various kinds of material, and may be used to produce various types of utilitarian objects.

BRIEF DESCRIPTION OF THE DRAWING

The foregoing and other objects of this invention, the features thereof, as well as the invention itself, will be more readily understood from the following description when read together with the accompanying drawing, in which.

In the drawing, corresponding parts are referenced by similar numerals throughout.

DESCRIPTION OF A PREFERRED EMBODIMENT

Figure 1:
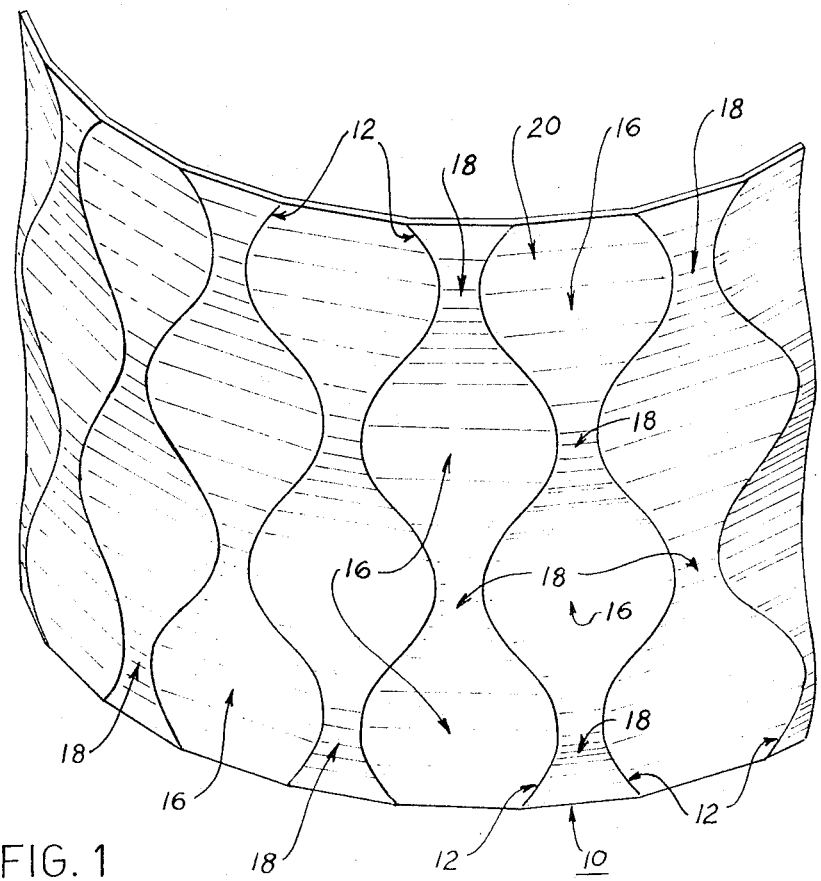
FIG. 1 is a perspective view of a cylindrically curved folded structure embodying this invention.
Figure 2:
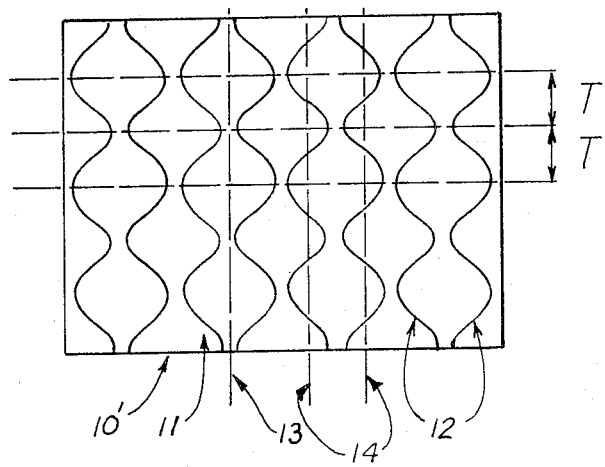
FIG. 2 is a plan view of a sheet embodying this invention and having curved hinge lines suitable for forming the cylindrical folded structure of FIG. 1.

In the form of the invention illustrated in FIG. 1, a partially cylindrical sheet 10 is illustrated with a series of curved fold or hinge lines 12. The structure of FIG. 1 may be formed from a planar sheet 10' shown in FIG. 2, which sheet may be made of any suitable flexible materials such as plastics, metals or papers which are foldable and bendable to the desired shape and which can be embossed or otherwise constructed to provide the desired hinge lines 12. The undulating fold lines 12 are formed in the sheet in any suitable fashion and described in greater detail hereinafter, for example by embossing or scoring. In the embodiment of FIG. 1, the undulating lines 12 are substantially identical. That is, they undulate about axes 14 which are generally parallel and which are uniformly spaced. In addition, the periods of the undulations in FIG. 2 are also uniform, and this is indicated in the drawing by the half-period T. Each hinge line undulates in the opposite direction (e.g., peak positive) from the direction (peak negative) of the adjacent hinge lines on each side of it, at corresponding points of cross-section.

Figure 3:
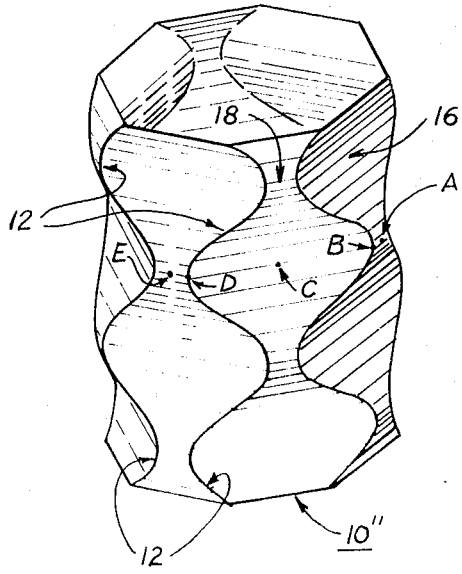
FIG. 3 is a closed cylindrical fold structure embodying this invention and which may be formed by closing the partially cylindrical structure of FIG. 1.

The sheet 10 of FIG. 1 may be considered as a fragment of the sheet 10' of FIG. 2, and as an enlarged view thereof. In FIG. 3, a similar cylindrical structure is formed, with the cylinder 10" being closed and with the hinge lines 12 being of uniform periodicity and uniform spacing from a sheet such as that shown in FIG. 2. In forming the partially cylindrical structure 10 of FIG. 1, or the closed cylinder 10" of FIG. 3, the sheet 10' is bent about the axis of the cylinder, and during the bending the structure tends to fold along the axes 14 to shorten the height of the sheet. At the same time, the planar surface of the sheet 10' assumes the curved surfaces of the folded cylindrical structures 10 and 10". That is, the surface assumes a series of concave surfaces 16 followed by convex surfaces 18. Thus, between each two curved hinge lines 12 there is formed a curved surface to the folded cylindrical structure 10, which undulates between concave and convex surfaces 16 and 18, and the curvature is in a single direction generally along the axes 14 of the undulations or the axis of the three-dimensional structure itself. This characteristic may be seen by observing the curvatures extending along a segment 20 between two adjacent hinge lines 12; along the segment the curvature is successively concave 16, convex 18, concave 16, and convex 18. In adjacent segments 20, the curvatures are just the reverse on opposite sides of each hinge line 12 at corresponding points; i.e., a concave surface 16 is contiguous to a convex one 18. Though the hinge lines are curved and exist at the intersection of curved surfaces, the hinges do not produce any stretch or compression of the surfaces, only bending.

Figure 13:
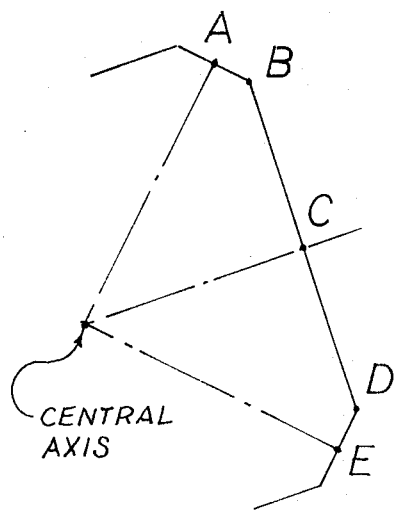
FIG. 13 is an ideal geometrical diagram used to explain an aspect of this invention.

The surfaces 16 and 18 do not have any curvature in the transverse direction of a cross-sectional plane at right angles to the axis. Any such cross-sectional plane is a polygon, which may be closed as in the cylinder of FIG. 3, or open as in the partial cylinder of FIG. 1, and which varies with its location along the axis, and may be regular or irregular, depending upon that location. The length of each side of that polygon (as shown in FIG. 13 representing a portion of a cross-section of FIG. 3) at any selected location depends upon the spacing between the two adjacent hinge lines 12 that form the side.

The structure of FIG. 3 is a quasi-cylinder, in that the overall surface only approximates a cylinder. For any cross-section, the polygon has every other segment thereof equal in length and equidistant from the center of the cross-sectional polygon (see FIG. 13). A circle can be passed through this polygon which would be within the polygon at alternate sides and without the polygon at the other alternate sides, and the circumference of the circle would equal the perimeter of the polygon. This circle might be called the mean circle for the polygon, and a mean circular cylindrical surface exists for the overall structure of FIG. 3 and would provide the mean circle for each cross-sectional polygon. The center of the mean circle is also the center of the polygon.

Figure 4:
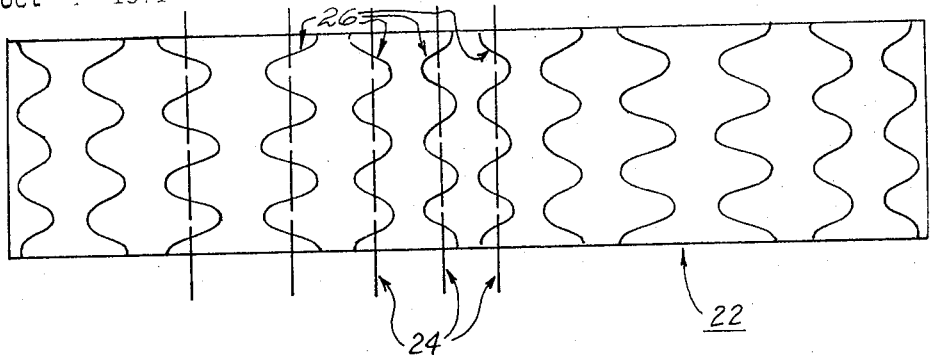
FIG. 4 is a plan view of a sheet embodying this invention and having curved hinge lines that vary in period and in spacing and which is suitable for forming a cylindrical structure of oval cross-section.

In the embodiment of FIG. 4, the sheet 22 has its hinge lines 26 formed about axes 24, which axes are spaced non-uniformly. With such an arrangement, the overall configuration of the folded structure that is formed from the sheet 22 is non-circular, and a closed oval shape can be formed from the sheet 22. The curved hinge lines 26 were designed to produce a generally mean elliptical shape to the folded structure. For this purpose, the amplitudes of the curved hinge lines 26 vary in any quadrant of the oval or elliptical structure that is produced. Symmetrically located hinge lines 26 are designed to be the same. The periods of the curved hinge lines 26 are uniform for each hinge line on the sheet 22; however, variations in the periods may be provided to produce different effects.

Figure 5:
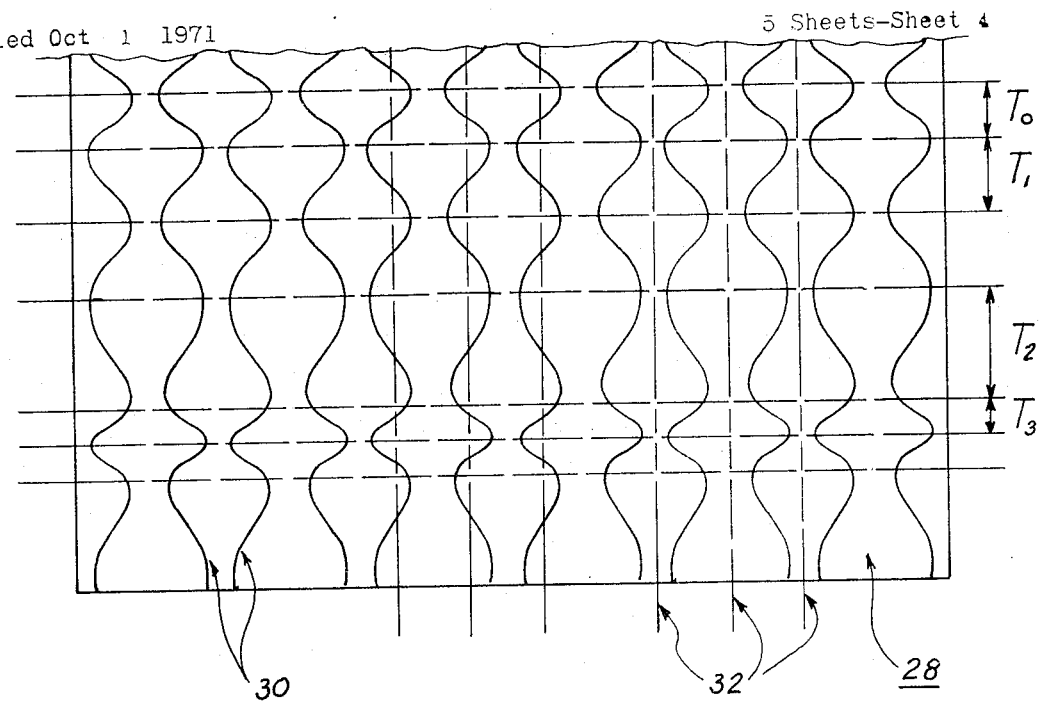
FIG. 5 is a plan view of a sheet embodying this invention and having curved hinge lines with varying periodicity along their axes but uniform in spacing.

An example of an embodiment of this invention with varying periods for the undulations is illustrated in FIG. 5, in which the sheet 28 has parallel and uniformly spaced axes 32 for undulations 30, so that a quasi-cylindrical three-dimensional fold structure is produced in a manner similar to that shown in FIG. 3. However, the half-periods $T_0$, $T_1$, $T_2$, $T_3$ of the undulating hinge lines 30 vary, whereby variations in the depths of the folded structures are achieved. The mean cylindrical surface for the folded structure produced with the sheet 28 of FIG. 5 is circular, due to the uniform spacing of the parallel axes 32 of the hinge lines. The amplitude of the undulating hinge line determines the depth of the fold, while the ratio of amplitude to period and the shape of the curved hinge lnie 30 in the vicinity of the maximum amplitude determines the radius of curvature of the fold. Thus larger amplitudes tend to produce deeper folds and larger ratios of amplitude to period tend to produce tighter folds.

Figure 6:
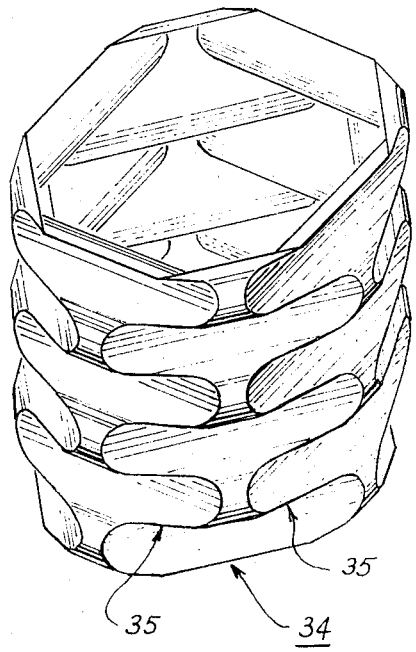
FIG. 6 is a perspective view of a cylindrical fold structure embodying this invention and having a high degree of foldability and illustrated in the fully folded condition.

In the folded structure 34 illustrated in FIG. 6, a large ratio of amplitude to period of the undulations 35 produces the deep, tight folds that are illustrated in the quasi-cylindrical fold structure that is illustrated. In contrast to the fold structure of FIG. 6, the related quasi-cylindrical structure of FIG. 3 has a relatively small ratio of amplitude to period, and though fully folded, the folds are relatively shallow and extended in contrast. Depending on the particular structure to be designed, there is a substantial independence in variation available for the parameters of the spacing of the undulation axes, the size of the amplitudes of the undulations and whether they are uniform or not, as well as the size of the periods of the undulations and whether they are uniform or not. In addition, curves for the hinge line may be aperiodic and need not be of any particular character, nor need they be uniform from one hinge line to the next. Regularly periodic and smoothly undulating curves, such as sine curves, may be the most convenient ones to use for many applications; however, a large variety of other curves may be employed. Though periodic or other uniform and regular undulations may be generally easier to use and to fabricate, the designer has considerable freedom in choice of curves and in variations in their characteristics within a curve and from one curve to the next.

Figure 7:
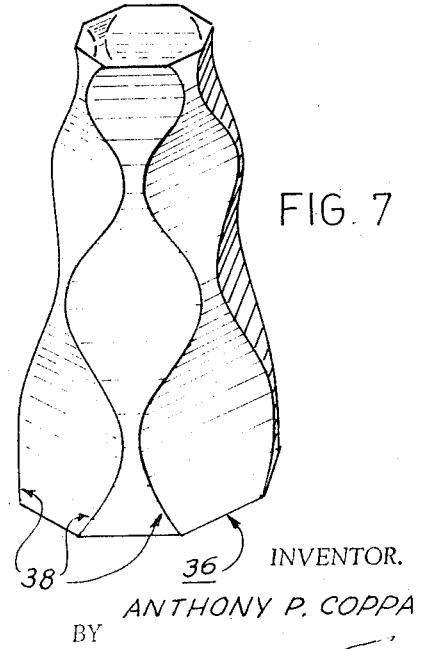
FIG. 7 is a perspective view of a conical fold structure embodying this invention.

Another basic folded structure that may be developed in accordance with this invention is one having a mean conical shape such as the folded structure 36 of FIG. 7. The hinge lines 38 are formed about axes 40 which are not parallel, but converge as indicated in the sheet 36' of FIG. 8. In a conical structure, such as shown in FIG. 7, where the axes of the hinge lines converge to a single point, the cross-sectional and surface dimensions (e.g., the dimensions of the cross-sectional polygons) vary with their relative distance from the apex of the cone, and variations are in geometrical proportion. Thus, in the case of the conical structure 36 of FIG. 7, in which the mean conical surface for the structure is circular in cross-section, the axes 40 are uniformly spaced, and the ratios of the half-periods $T_0$, $T_1$, $T_2$ are in geometric proportion, that is, $T_0/T_1 = T_1/T_2$. Similarly, the amplitudes of the undulating hinge lines 38 vary geometrically as they are spaced from the apex of the cone. Where the sheet 36' of FIG. 8 produces a regular conical structure 36 as shown in FIG. 7, in which the mean conical surface is circular in cross-section, an oval or non-circular cone can be provided by having non-uniform spacing of the converging axes 44 of the undulating hinge lines 46, such as is shown for the sheet 42 of FIG. 9. Thus, by varying the parameter of the axes spacing, as well as the parameters of the undulation amplitudes and periods, a variety of shapes with a generally conical overall configuratioin can be developed.

Both in the quasi-conical and in the quasi-cylindrical structures, at least two full "cycles" are required to produce a closed structure, where a "cycle" viewed at any cross-sectional periphery corresponds to the periphery spanning three successive hinge lines so that the two remote ones of those three are generally in the same phase relation. To produce a closed structure, generally the mating ends of the sheet are formed so that they do not intersect a hinge line, but rather form a generally straight line (preferably at the mid-point) between two hinge lines, so that the mating of these edges is a relatively simple task. Alternatively, mating may also be along matching curved hinge lines, preferably by using an additional quarter-cycle of sheet for overlapping.

The geometrical form of these structures is such that they exhibit various properties of axial and circumferential rigidity depending on the geometry of the curved intersection line between surfaces. When for a given cross-sectional size the amplitudes of the curve are small in relation to its period, the structure possesses axial rigidity and relatively small lateral rigidity; when, however, the amplitudes are relatively large, the axial rigidity will be small whereas the lateral rigidity will be very large. Hence, according to the characteristics of the curve, the structure may be designed with a specific amount of axial and lateral rigidity. The axial rigidity in fact may be negligible and in this condition, the structure can be expanded and contracted to a limited degree or bent to conform with a curved central axis.

The above remarks pertain to structures having closed cross-sectional perimeters. When the perimeter is not closed, however, all structures are flexible, their resistance to perfect flexibility being dependent on the wall bending rigidity of the material making up the structural surface and the bending stiffness of the curved joint or hinge between surface elements. This latter stiffness can be made to be negligible, since the curved joint can be constructed as a hinge that has substantially complete flexibility. Flexibility can also be enhanced by decreasing the wall thickness or other essentially similar means in regions of peak convex and peak concave curvature (viewed from the exterior of the structure).

The axial flexibility and radial rigidity of the folded structures largely depend on the shape of the curved fold lines as they exist in the folded state (see (FIG. 6). Considering, for example, curves such as those shown in FIG. 1, that is, having a generally sinusoidal shape, the overall axial flexibility and radial rigidity will vary according to the ratio of the amplitude A of the curve to its period T, as the curve is situated in the folded state. For small ratios (e.g., $A/T$ approximately .1), the axial flexibility is small and the radial rigidity moderately greater than for the equivalent unfolded cylinder or cone. For large ratios (e.g., $A/T$ very large due to T being very small), the axial flexibility is high such that substantial expansion, linear or rotational, can be easily accommodated despite the fact that the perimeters of the cross-sections are closed. Here the radial rigidity is very high compared with the equivalent unfolded cylinder or cone; with such large ratios of $A/T$, the form of the structure is similar to a bellows.

The reason that such expansions may be accommodated is due to the weak coupling between axial and radial expansions that exist for large ratios of $A/T$. By this coupling is meant the inseparable tendency of the radius of curvature of the cross-section to increase when the folded structure is subjected to an axial expansion and to decrease when subjected to an axial contraction. When the $A/T$ ratio is large, the tangents to the fold curve, representing as they do the local hinge axis, are oriented generally much more toward the circumferential direction than the axial direction. The tangent to any point on the hinge line may be represented as a vector situated along the tangent. This vector is formed conventionally by the right hand rule. With the fingers of the right hand in a grasping attitude about the tangent and pointing in the direction of the hinged rotation, the outstretched thumb represents the vector and points in the positive direction of the vector. Hence such a vector, directed entirely in the circumferential direction, signifies a hinge action producing entirely axial expansion (or unfolding). Since therefore, over most of the curves having large ratios of $A/T$, the tangents (and the hinge vectors) are oriented strongly in the circumferential direction, the axial expansion produces relatively little tendency for the cross-sectional radius to increase. The axial component of the hinge vector in fact indicates this latter tendency.

When, however, the curves in the folded state have small ratios of $A/T$, the tangents to the curve and hence the hinge vectors are generally oriented more in the axial direction. As a result, the axial component of the hinge vector is substantial, and any tendency of the structure to expand axially will produce a strong tendency for the cross-sectional radii to increase. As a result, the structure will be essentially rigid in the axial direction.

Whereas tangents over most of the fold curve are oriented strongly in the circumferential direction, tangents in the regions of the peak amplitude are directed strongly in the axial direction (as may be seen from FIG. 6). Actually, the direction of the tangents to the curve varies continuously along the curve. In such regions of peak amplitude, therefore, the hinge vectors possess substantial axial components, and in fact, at the points of maximum amplitude they are directed entirely axially. In these regions, therefore, resistance is set up to axial expansion, and it turns out that such regions remain essentially rigid while the axial expansion occurs. The flexibility of the structure is therefore due mainly to the property that over most of the curves (possessing large $A/T$ ratios), the tangents are oriented strongly in the circumferential direction and in such regions the hinges are quite flexible.

In folded structures having straight line folds, the direction of the tangent to the curve is constant, it being of course coincident with the fold line itself. Such structures therefore offer a constant tendency to hinge about the fold lines. Hence, in very compacted structures of this type, the hinging action is uniform along the fold line and readily permits axial expansion.

As a result of such rigid regions of the fold curve at the peak amplitudes, curved-folded structures may not be compacted as much as linearly folded structures. The axial length of a fully compact linear-fold structure is a multiple of the wall thickness of the constituent material, whereas that of a curved-fold structure is a multiple of the dimension (approximately the diameter) of the curved rigid region at the peak amplitude, as may be seen in the fully folded structure of FIG. 6. The term compacting ratio $L_f/L$ may be used, where $L_f$ is the axial dimension of a certain number (e.g., two) of folds of the compact folded structure (such as that of FIG. 2), and L is the initial axial length of the unfolded structure. Hence $L_f/L$ for the curved-fold structure will always be greater than for the straight-fold structure.

If the constituent material of the folded structure is itself stretchable like highly plastic or rubbery materials, the compacted length of the curved-fold structure may be further reduced, even to the extent that the material is packed as tightly as the straight-fold structure. Upon release of this compaction force, the structure will return to the natural state of the curved fold shown in FIG. 6. This action would give the bellows form of FIG. 6 a certain amount of springiness which could be useful, for instance, to provide vibration or shock isolation.

The extent to which such compacted (bellows type) structures may be expanded and the reasons limiting the amount of extension may be explained as follows: As discussed previously, axial expansion is readily accommodated as long as the hinge vectors over most of the curve are oriented strongly in the circumferential direction. When during expansion the hinge vectors develop substantial axial components, further expansion is accompanied by a faster increase of internal strain in the structural material. This is signaled by an increasing rate of build-up in axial resistance to further expansion. We may define an allowable expansion factor as the ratio of the allowable expanded length of the structure, $L_e$, to the initial unfolded length, L. A typical value of $L_e/L$ for curved fold structures is about .15.

Consider a given folded structure based on curved fold lines, such as the closed perimeter 10' shown in FIG. 3. Such a figure is described in terms of the number of "cycles" ($n=4$ in the example) and the shape of the fold curve ($A/T$ is about 1/2) in the folded condition. If the structure is cut tangentially and pulled apart axially, it will open circumferentially. If this is continued to the ultimate extent, the structure is converted into a flat sheet (the generating sheet 10'). During the process, the fold-curve of the hinge line 12 is transformed into another curve, generally similar to the fold curve in the folded state, but having a smaller amplitude and a longer period, i.e., its $A/T$ ratio is smaller in the unfolded state (see FIG. 2). Hence the fold curve always has a smaller $A/T$ ratio in the unfolded state than in the folded state.

Consider now the same sheet configuration of FIG. 2 that resulted in the closed form of FIG. 3, and remove a longitudinal strip, containing two adjacent fold curves, the strip 11 to the broken line 13 as shown in FIG. 2. Now the pattern is reduced to $n=3$. If the sheet is now compressed axially, it closes circumferentially until the free longitudinal edges come in contact, thereby resulting in a figure with a closed perimeter. The fold curve produced in the new folded state has a larger amplitude and a smaller period than those of the original ($n=4$) figure in the folded state. A further transformation of the figure is obtainable by removing another longitudinal strip as before, thereby producing a structure with $n=2$, the minimum allowable number.

Starting with a given system of fold curves in the unfolded state (i.e., on the generating sheet, with the curves having an amplitude period ratio of $$\left(\frac{A}{T}\right)_o$$

the $A/T$ ratio of the curves in any subsequent folded state increases according to the amount of axial shortening that is produced. Simultaneously, the amount of circumferential closing that occurs depends on the form of the initial curve and the number of cross-sectional cycles. Fold curves having small ratios $$\left(\frac{A}{T}\right)_o$$

(unfolded state) close faster circumferentially than those with larger ratios. The term "closing faster" is used to mean that the amount of circumferential rotation (closure, but also applies to opening) per unit of axial shortening (or expansion) is greater.

Referring to the basic form of the structure, such as shown in FIG. 3, the cross-sections (perpendicular to the central axis) are polyonal in form, as previously stated. For structures that are based on circular cones, or cylinders, the form of the polygon will have the character shown in FIG. 13, which depicts but a portion of the total polygon. Points A, B, C, D and E correspond to the same named points identified in FIG. 3, and hence the line segment AB lies along the outward crest or convex peak 18 of a surface element whereas the segment BD lies entirely along the inward crest (or trough) or concave peak 16 of the adjacent surface element. Cross-sections which pass through such points are called principal cross-sections. The portion of the polygon ABC is called a half-cycle of the polygon. Structures based on circular reference surfaces (surfaces of revolution) have equal half-cycles throughout these principal cross-sections. This invention also includes structures whose principal cross-sections are composed of unequal half-cycles and such structures have non-circular reference surfaces, such as the oval structures produced by the sheets of FIG. 4 or FIG. 9.

The quasi-cylindrical and conical structures may be either closed or open, and with the central axis oriented vertically as rigid free standing structures or as horizontal structures, either rigid or flexible. The structures are flexible in both axial and radial directions, except when they are closed (i.e., their edges are attached together) or, if open, when their free edges are constrained. When so constrained, the structure has rigidity in both axial and radial directions, depending on the amplitude to period ratio of the hinge lines. A horizontal quasi-cylinder of the open form may be constrained to form a tunnel-like structure by attaching the horizontal free edges to a base plane (e.g., a hard foundation plane, or a sheet of material that possesses normal and diagonal tensile membrane resistance). Various other shapes may be achieved with open forms and by bending the form around a curved central axis (i.e., rotational or combined rotational and linear expansion), and the aforementioned article illustrates a number of such shapes (e.g., quasi-spherical or quasi-elliptical domes, tori, canopies or barrel vaults having closed ends) that may be similarly achieved with curvilinear hinge lines.

The foldable structures with curved surfaces and curved hinge lines may be used for a wide variety of familiar articles. By way of a few examples: for educational toys; for collapsible containers (cylindrical or conical) such as wastebaskets or disposable trash containers; for rigid containers of a novel corrugated type with smooth facing sheets on one or on both sides of the folded structure used in place of the conventional corrugated core; for tents, beach umbrellas, canopies: for lampshades and fixtures; for panels for ceilings and ceiling lamps; for window or wall panels.

Figure 8:
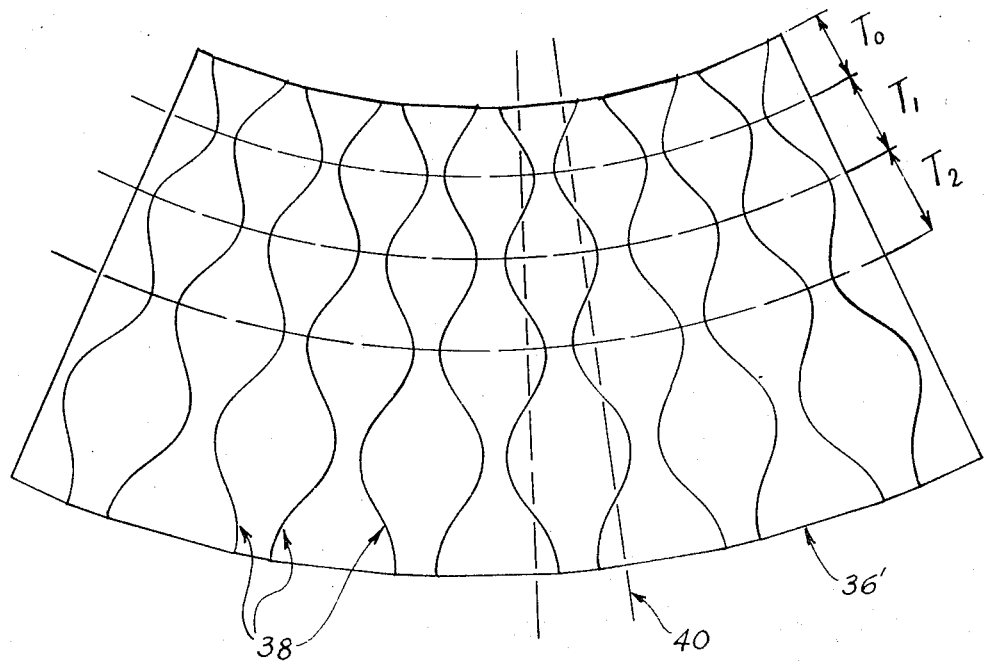
FIG. 8 is a plan view of a sheet embodying this invention and having curved hinge lines along converging axes and suitable for forming the conical structure of FIG. 7.

Fabrication of the sheets and structures described above may be performed in various ways. For example, embossing may be used to form the sheets illustrated in FIGS. 2, 4 and 5 by means of a pair of cylindrical embossing rollers 50 and 52 mounted in substantially tangential relation with a sheet passing therebetween, and moved by the rollers or by a separate action. The embossing action may take various forms, either mechanical or thermal, depending upon the sheet material. In one form the embossing roller 50 has a knife edge 54 in the desired continuous undulating pattern repeated about the periphery of the roller. The other roller 52 has a continuous mating groove 56 in the same pattern as a corresponding knife edge 54, and similarly repeated about the roller. This configuration is suitable for continuous processing of sheet material as it passes between the rollers 50 and 52, in which the mechanical action may press a grooved hinge line into the material, or in which additional heating action in addition or instead may be employed on thermoplastic materials. In a similar fashion, conical embossing rollers 58 and 60 may be constructed with embossing grooves and knife edges in a manner similar to FIG. 10, but by means of the conical surfaces of the rollers, the undulating hinge lines 62 produced in a sheet 64 would be appropriately formed such as shown in FIGS. 8 and 9 for the desired conical structures.

Figure 9:
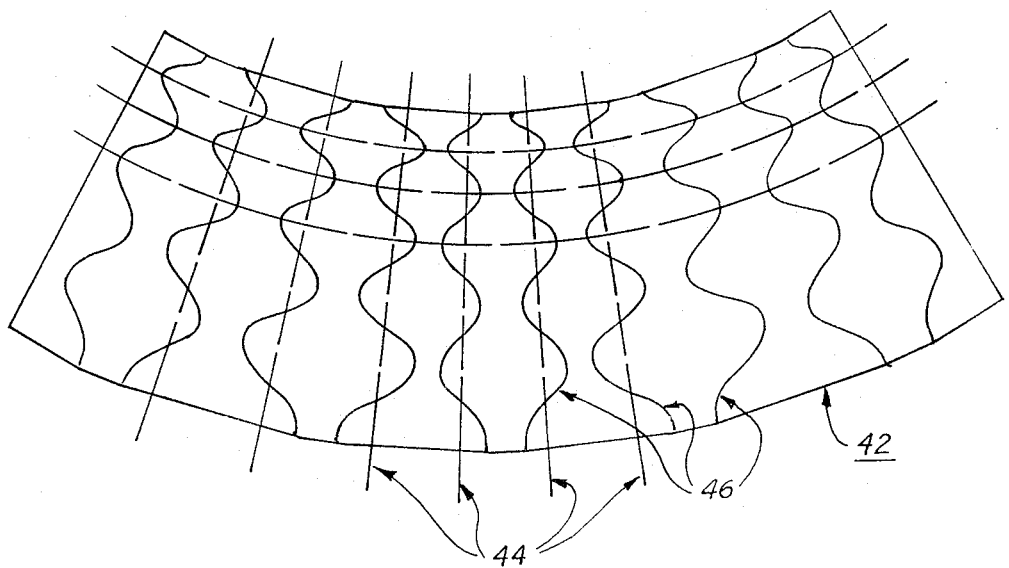
FIG. 9 is a plan view of a sheet embodying this invention and having undulating hinge lines along converging axes and suitable for forming a conical folded structure having a generally oval or elliptical cross-section.
Figure 11:
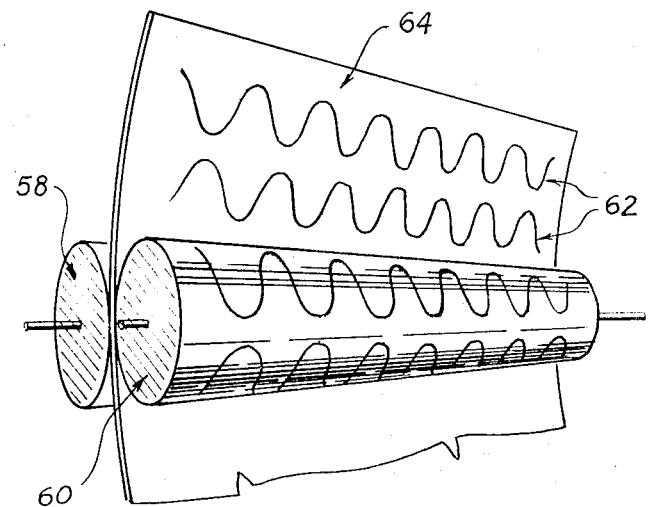
FIG. 11 is a perspective view of an embossing mechanism for fabricating the foldable sheet suitable for conical structures shown in FIG. 8.
Figure 12:
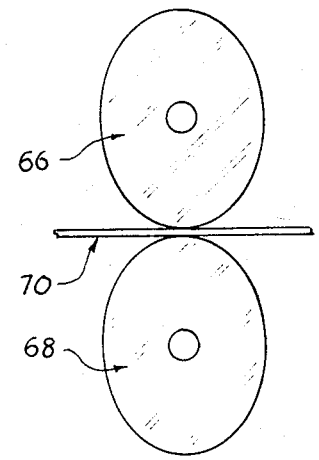
FIG. 12 is an end view of embossing rollers for embossing sheets having variable speed axes of undulation such as those shown in FIGS. 4 and 9.

In FIG. 12, a pair of oval embossing rollers 68 and 70 are illustrated for embossing a sheet 70 with a configuration of undulating hinge lines having varying spacing of the axes thereof such as are shown in FIGS. 4 and 9. In the case of the sheet 22 for a cylindrical structure, the embossing rollers would be cylindrical in shape, and for a sheet 42 with undulations suitable for a conical structure, the rollers 66 and 68 would be conical, as shown in FIG. 11.

Embossing or scoring of curved lines may also be done on flat sheets by pressing the sheet between platens which have similar knife edge and grooved undulating patterns in them. The pressing action could impress the desired line pattern simultaneously on a single sheet or could impress as little as one undulating line in a step by step pressing action, on a continuously fed sheet.

Figure 10:
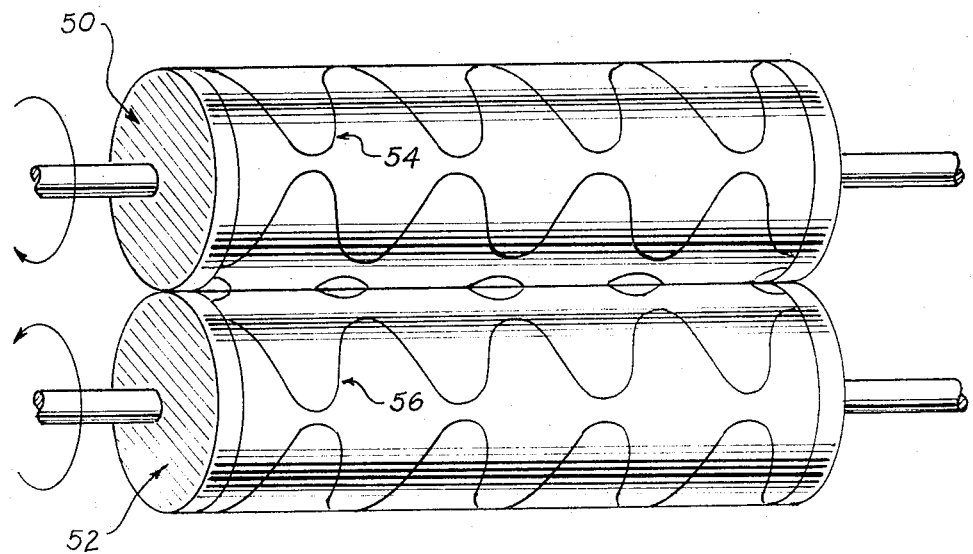
FIG. 10 is a perspective view of an embossing mechanism for fabricating the foldable sheet of FIG. 2.

Alternative fabricating techniques may be used; for example, the embossing may be performed only part way through the sheet material, as by omitting the groove 56 from roller 52 in FIG. 10. Perforated lines may also be used to form the continuous hinge lines.

Various methods can be used to transform the embossed sheet into a fold structure, depending on the overall size and amount of resistance to bending. Small structures can, for instance, be folded by closing an embossed generating sheet into a cylinder or cone, as the case may be. The ends of the closed, but as yet unfolded, structure can be placed in grooved end plates, and the structure is then subjected to an axial compression by applying force to the end plates. This may be effected conveniently by means of a threaded rod (not shown) which is fixed to the center of one plate and passes through the center of the opposite plate, compression being applied by turning a nut on the threaded rod. With some compression-displacement maintained, the structure may be folded by pushing in at the trough regions, such as regions 16 in FIG. 1, first at diametrically opposite points on a given, preferably the mid-length, cross-section, until inward deflection of all regions 16 is obtained there. It will then become progressively easier to produce additional folding, especially if compression is maintained. Folding can also be done by reducing the pressure from the air space within the closed structure whose ends are positioned in sealed end plates. This process results in simultaneous application of axial and radial compression of the closed structure and automatically generates the fold structure. This latter method is suitable for high speed production.

The hinged sheets may be assembled from a series of segments such as the segments 20 of FIG. 1 that may be individually fabricated and then joined together along mating curved edges by suitable flexible hinge material. Such segments 20 may be formed with thin tabs along the hinge edges, which tabs of adjacent segments may be overlapped and bonded together. Flexible pneumatic tubing may be used for the hinges, which tubing could be used to expand or contract with changes in internal pressure.

In addition, the sheets may be molded with the hinge lines formed in the molding process. Molding is especially useful to form the sheets in the final quasi-cylindrical or conical form, or partially so, and with the hinge lines formed during the molding or afterward. By pre-stressing the sheet into the final form, followed by formation of the curvilinear hinges (by embossing or otherwise), a better stress distribution is achieved so that the sheet is readily bent and folded into that final form. The hinge lines could be spring wired for extra strength and with a desired bias to expand or to contract.

What is claimed is:

1. A fold structure comprising:
   a sheet having a plurality of undulating non-crossing curvilinear lines along each of which adjacent sheet portions are hinged; adjacent ones of said hinge lines undulating in opposite directions; said sheet being formed in a three-dimensional shape with a cross-section having a plurality of straight sides.

2. A fold structure as recited in claim 1 wherein said structure has an axis, and said hinge lines are curvilinear about individual axes each having a substantial component along said structure axis.

3. A fold structure as recited in claim 1 wherein said sheet is formed into curved surfaces between adjacent hinge lines, and said surfaces are curved along a single direction.

4. A sheet construction for producing a folded structure comprising:
   a flexible sheet having a plurality of undulating non-crossing curved lines, corresponding parts of adjacent ones of said lines undulating in opposite directions along each line, the adjacent surfaces of said sheet being curvable in a single direction and hinged at the line;
   whereby the sheet is formable in a three-dimensional shape with a polygonal cross-section.

5. A sheet construction for producing a folded structure comprising a flexible sheet member having a plurality of curvilinear hinges about which said sheet member is foldable; said curvilinear hinges undulating about separate non-crossing axes, and adjacent ones of said hinges undulating in opposite directions at corresponding points.

6. A sheet construction for producing a folded structure as recited in claim 4, wherein said curved hinge lines undulate periodically with a uniform amplitude for producing a cylindrical structure.

7. A sheet construction for producing a folded structure as recited in claim 4, wherein said curved hinge lines are sine curves.

8. A sheet construction for producing a folded structure as recited in claim 4, wherein said curved hinge lines have a varying periodicity.

9. A sheet construction for producing a folded structure as recited in claim 8, wherein said varying periodicity of said hinge lines is in geometrical proportion for producing a conical structure.

10. A sheet construction for producing a folded structure as recited in claim 4, wherein said hinge lines undulate about axes that are uniformly spaced.

11. A sheet construction for producing a folded structure as recited in claim 4, wherein said hinge lines undulate about axes that are non-uniformly spaced.

References Cited
UNITED STATES PATENTS

| | | | |
|---|---|---|---|
| 2,549,189 | 4/1951 | Gabo | 161—130 |
| 245,772 | 8/1881 | Boshardt | 161—17 |
| 3,313,080 | 4/1967 | Gewiss | 161—130 |
| 2,257,428 | 9/1941 | Ruegenberg | 161—130 X |
| 2,796,157 | 6/1957 | Ginsburg | 161—130 X |
| 2,164,966 | 7/1939 | Tutein | 46—21 UX |

PHILIP DIER, Primary Examiner

U.S. Cl. X.R.

46—21; 161—130, 133; 240—108